3,184,376
METHOD OF PRODUCING ANTISEPTIC
COMPOSITION
Werner J. Degoli, C.P. 208, Zurich 47, Switzerland
No Drawing. Filed Apr. 16, 1962, Ser. No. 197,558
8 Claims. (Cl. 167—14)

This invention relates to a process for the preparation of a new composition of matter. More particularly this invention relates to the preparation of a novel composition having desirable properties as a disinfectant, bactericide, fungicide, and the like.

One embodiment of this invention involves a process for the manufacture of an aqueous composition having as initial reactants or components at least one metal oxide. Mixtures of metal oxides may also be used if preferred. Both these above compositions comprise suspended matter in the form of very finely divided micro metal particles of ionic size. The resulting solution is an easily altered solution of substantial concentration, being comparatively stable. Some of the many uses to which this solution may be put are as a prophylactic, sterilizing agent, or disinfecting agent. This embodiment of the method of the present invention is carried out by contacting a prefixed amount of silver oxide with an aqueous solution of a compound selected from the group consisting of sodium or potassium persulfate, $Na_2S_2O_8$ or $K_2S_2O_8$, respectively. The product produced thereby is a stabilized homogeneous solution comprising ionized silver (silver ions—Ag+), potassium or sodium sulfate ($K_2SO_4$ or $Na_2SO_4$), with possibly minute quantities of silver oxide ($Ag_2O$), silver sulfate ($Ag_2SO_4$) and free silver of microparticulate size. This last form of silver would be particles within the range of 100–1000 A.U. This composition (in addition to those above noted) provides a product useful as a bactericidal agent, as a fungicide, as a veterinary composition, as a germicide, insecticide, pesticide, cleansing and deodorizing agent for animal bowels and meat products, food additive, douching agent, as a contraceptive and antiseptic solution for feminine hygiene, and the like.

It was surprising to find that the bactericidal and disinfecting effect of this composition remains relatively constant and stable over a comparatively long period after manufacture. The potassium or sodium persulfate that is used in the manufacture is reduced to the sulfate upon agitation and admixture with the water and silver oxide. This resulting potassium or sodium sulfate imparts a highly desirable stabilizing effect on the ionized silver (silver ions) without interfering with or altering the bactericidal or disinfecting properties of the silver oxide or free silver resulting in the final product. Not only does the sodium or potassium sulfate have a stabilizing effect on the resulting silver and/or silver oxide, but it has a two-fold carrier-buffer function on the solution resulting without imparting any degree of toxicity to said resulting solution. This property of non-toxicity is extremely important since the composition of this invention has definitely proven utility in the preservation, cleaning and prophylactic treatment of food stuffs. In the preferred embodiment of this invention one (1) part of silver oxide is contacted with an aqueous solution containing about three and one half (3.5) parts of sodium persulfate ($Na_2S_2O_8$) or potassium persulfate ($K_2S_2O_8$).

The preferred ratio of combination of these components varies from about 0.5–4.0 parts of silver oxide to about 0.5–10.0 parts of sodium or potassium persulfate. It will be understood, however, that these amounts are merely used by way of preference; the invention is not to be limited to these ratios. One skilled in the art may use any combination of these components (depending on the desired result) without departing from the spirit of this invention. Also, it is to be understood that other alkali metal persulfates may be, under certain conditions, used in the process of this invention. In carrying out the novel reactions set forth in this application a temperature up to about 80° C. may be employed although, as shown by the following examples, a somewhat lower temperature in the range from about 60° C.–70° C., is preferred.

Oligodynamic metal compositions have long been known and used with varying degrees of success in situations where it is required to control microorganisms. There have been some prior art methods of providing said oligodynamic metals. However, the vast majority of these methods have some serious shortcomings. When silver, for example, is the oligodynamic metal of interest, the known manufacturing methods for the production of this silver leave much to be desired. In these prior art methods, it is extremely difficult to control the final silver concentration in solution with any substantial degree of accuracy. A further important disadvantage of the prior art methods of manufacture is that the retention of any degree of solution stability is absent. Upon making a silver solution by the most popular prior art methods was found that the stability of the resulting aqueous silver solution was very low. The process of this invention provides an easy convenient method for the preparation of an aqueous silver solution that has a high degree of activity on micro-organisms, is easily accurately controlled as far as concentration is concerned, and is of the highest stability, and remains homogeneous over a considerable period of time. Because of the uniform stability of the compositions manufactured by the process of this invention, they may be shipped and stored for long periods of time; and at the time of actual use are as effective as when first formulated. The desired concentration of the final product may be accurately controlled as a prefixed amount of each component results in a pre-determined final concentration. The silver concentration or strength of the final solution may be easily and conveniently found, and evaluation of the required dilution in any specific instance may be conveniently determined.

In other modifications and embodiments of this invention, silver oxide may be used together with other oxides in making a stabilized composition having the above enumerated desirable properties. Metal oxides other than silver oxide may be combined, if desired, to result in a useful stable composition. These other metal oxides are to be considered within the scope of this invention. These metal oxides may be used together with a buffer as will be later defined. Thus, the purpose of this process is to bring the difficulty soluble metal oxides, either separately or in combination, or with metal salts, in the form of very finely divided micro metal particles of ionic size, into a stable, light-resistant, odorless, colorless, highly concentrated aqueous suspension.

In this way it is also possible to improve the catalytic oligodynamic properties and the bactericidal action of silver, which is effective principally against the coli group of bacteria, in combination with other metal oxides (copper oxide) or metal salts, in order to improve not only the bactericidal and bacteriostatic properties of this noble metal, but also as a fungicide.

The metal ions or the very finely divided micro metal particles (in a range of 100–1000 A.U.) derived from the metal oxides are stabilized and held in suspension by the selected buffer. In our case, $Na_2S_2O_8$ (sodium persulfate) and $K_2S_2O_8$ (potassium persulfate) were mostly used. But we may employ eventually also buffers from other groups, as for instance $K_4P_2O_7$ (potassium pyrophosphate) or $K_3PO_4 \cdot H_2O$ (potassium orthophosphate). This enumeration of the buffer groups to be chosen does not imply any restriction as regards other existing possibilities.

By this method one or several metal oxides, as well as metal salts and metal oxides, in combination, can be brought into aqueous suspension, in a single process. The process is then represented as follows, for example:

| | Product |
|---|---|
| (a) Silver Oxide+Zinc Oxide+Buffer= | 2 metal oxides in combination+suspension colloids. |
| (b) Silver Oxide+Zinc Sulphate+Buffer= | 1 metal oxide and 1 metal salt in combination+suspension colloids. |
| (c) Silver Sulphate+Zinc Sulphate+Copper Sulphate+Buffer= | 3 metal salts in combination+suspension colloids. |
| (d) Silver Oxide+Copper Oxide+Zinc Sulphate+Buffer= | 2 metal oxides and 1 metal salt in combination+suspension colloids. |
| (e) Out of Series—just for example: Silver Orthophosphate+Cupric Orthophosphate+1 Metal Oxide Buffer+1 Metal Oxide= | 2 metal salts of the orthophosphate groups in combination with 1 or 2 different metal oxides+buffer. |

It should be pointed out that these different variants can be extended as desired, although the process relates primarily to the oxide and salts of the metal silver.

The following examples will further illustrate the process of preparing the compositions of this invention. These examples are meant to illustrate and not limit the invention to the particulars set out:

*Example I*

A 150 liter vessel consisting of cement, enamel, glass (or any desirable material relatively inert to the components of this process) was used. 50 liters of distilled water was poured into the vessel. 156.25 grams of silver oxide was mixed with 546.87 grams of potassium persulfate giving a total mix of 703.12 grams. This mix was added slowly to the water in said vessel while heating said vessel and contents to about 60°–70° C. The contents of said vessel are constantly agitated for about 10 seconds every hour for about 3–4 hours. Thereafter it is agitated every 4–6 hours. The temperature after the mixing is maintained at about 30°–35° C. for up to about 20 hours. The top of the mixing vessel must be open to the atmosphere during the above described agitation. When the solution becomes clear without any substantial turbity an additional 25 liters of water are added to the mixture. The mixture is maintained at about 20°–35° C. after this above water addition. The mixed solution is allowed to stand for about 10–15 additional hours after which an additional 25 liters of water is added to the solution.

The solution is then allowed to cool to room temperature, is filtered by any desired filtering means, and is stored in brown bottles or containers.

*Example II*

A 150 liter vessel consisting of cement, enamel, glass (or any desirable material relatively inert to the components of this process) was used. 500 parts of distilled water was poured into the vessel. 156.25 grams of silver oxide was mixed with 546.87 grams of potassium persulfate giving a total mix of 703.12 grams. The mix was added slowly to the water in said vessel while heating said vessel and contents to about 60°–70° C. The contents of said vessel are constantly agitated for about 10 seconds every hour for about 3–4 hours. Thereafter it is agitated every 4–6 hours. The temperature after the mixing is maintained at about 30°–35° C. for up to about 20 hours. The top of the mixing vessel must be open to the atmosphere during the above described agitation. When the solution becomes clear without any substantial turbity an additional 250 parts of water are added to the mixture. The mixture is maintained at about 20°–35° C. after this above water addition. The mixed solution is allowed to stand for about 10–15 additional hours after which an additional 25 parts of water is added to the solution.

*Example III*

To one part of $Ag_2O$ is added 2.5 parts of potassium persulfate $K_2S_2O_8$ and about 332.2 parts of water. This solution is added to a vessel as in Example I and is brought to a temperature of about 65° C. for a time of approximately 10 minutes. The solution is agitated and then cooled to about 30°–40° C. After full absorption of the $Ag_2O$ and $K_2S_2O_8$ appears to be completed, another 332.2 parts of water is added. The solution is kept under constant agitation. After approximately 8–10 days of storage in a substantially dark vessel kept at a temperature of about 15°–35° centigrade, the solution is filtered to remove any undissolved or suspended impurities.

The compositions resulting from the above examples are highly stable aqueous solutions comprising silver ions, potassium sulfate or sodium sulfate, and possibly minute portions of $Ag_2O$ and $Ag_2SO_4$. The resulting solutions are free from odor, taste, and color, insensitive to light and ones which will retain their constant activity for even years.

Because of the constant stability of the composition of this invention, it may be shipped and stored for long periods of time; and at the time of use will be as effective as when first formulated. This is a primary advantage of the composition of this invention over the electrochemical aqueous ionic silver solutions heretofore used in the prior art. The prefixed content of silver ions also allows easy control and regulation of the desired concentration and strength. The strength of the solution used may be easily and conveniently found, and evaluation of the required dilution in any specific instance may be conveniently determined.

The process of this invention results in a desirably active silver solution illustrated by reference to the following examples:

*Example IV*

In this example a highly contaminated by bacteria substance, animal bowel, was used to illustrate the bactericidal effect of the composition made by the process of this invention. Samples of bowels from the identical source were taken and compared after treatment. The raw bowel specimen was not cleaned in any manner other than a 5–10 minute washing in running water. The water treated bowel was soaked in water for approximately 4 hours; the treated bowel was soaked in the same water for 4 hours and subsequently immersed for approximately ½ hour in a solution made from the composition of this invention. The solution was formulated by taking 1 cc. of the solution of this invention (which was 1 gram of silver ions and 2.5 grams of sodium or potassium sulfate dissolved in 1 liter of water) dissolved in 1 liter of water. The total concentration of silver ions, therefore, was approximately 1,000 gammas (or .001 gram) in 1 liter of water. The experiments were performed at room temperatures (16°–18° C.) and at 4°–6° C. The figures in the last three columns represent the number of remaining bacteria in sample bowels.

AT 16°–18° C.

| Time lapse after treatments | Raw bowel | H₂O treatment bowel | Bowel treated with composition of this invention |
|---|---|---|---|
| Start (0 hours) | 173,000 | 142,000 | 27,500. |
| 24 Hours | 235,000 | 175,000 | 31,700. |
| 72 Hours | Visibly altered | Visibly altered and incipient. | Normal (less than 173,000). |

AT 4°–6° C.

| | | | |
|---|---|---|---|
| Start (0 hours) | 193,000 | 175,000 | 29,900. |
| 24 Hours | 213,000 | 171,000 | 30,500. |
| 48 Hours | 285,000 | 193,000 | 34,600. |
| 72 Hours | Deterioration noticeable. | Fermenting and odor. | Normal during additional 72 hours period (less than 193,000). |

The tests conducted as illustrated above show that bacteria infested bowels treated with the composition of this invention were reduced in bacteria count at least 600%. They also show that deterioration of the tissue (spoiling) was greatly delayed by the use of the compositions of the invention.

*Example V*

To show the disinfecting and sterilizing properties of the composition of the present invention the following tests were performed.

Bottles used to contain milk were washed thoroughly. Half the bottles were washed in distilled water, the other half were washed in an aqueous solution containing 1,000 gammas of silver ions and 2,500 gammas of potassium sulfate. After each washing, the bottles were allowed to stand for 5 days and then were tested for fungi, cultures, etc. Those bottles washed in distilled water showed positive evidence of the presence of pathogens while sterility tests on those bottles treated with the composition of this invention formulated as above gave a negative reaction to the presence of pathogenic germs. Similar results were obtained using from 2–5 times the concentration of the above stated compositions.

It was interesting to note in the above test (Example V) that the bottles treated with the present composition showed a prolonged disinfecting and sterilizing effect. This was found to be due to the presence of minute portions (1.5 millionths) of silver ions or ionized silver remaining in each of the treated bottles. These traces of silver ions adhering to the glass were proven to be without any significance hygienically or toxicologically. Because of this prolonged effect, together with other desirable characteristics, the use of this composition in the pharmaceutical and cosmetic fields is extremely promising.

The solution in the above examples was odorless, colorless, of highest stability, insensitive to light and may be distinguished and identified as an oligodynamic metal dispersion containing microparticles of free silver, in watery suspension. In addition to the above uses, this composition has use in the treatment of drinking water, bactericidal ice, pharmaceuticals, cosmetics, treatment for the preservation of food stuffs such as frozen and canned foods, and also as a veterinary composition.

It is anticipated that the compositions of this invention may be combined with other substances to enhance, synergise, or supplement said substances. For example, the inventive composition disclosed herein may be combined with other bactericides, disinfectants, fungicides, sterilizers, vitamins, hormones, medicines, etc.

The examples and above specifics of the process of this invention have been given for purposes of illustration and not limitation. Many other ramifications will naturally suggest themselves to those skilled in the art upon a reading of this disclosure; these are intended to be encompassed within the scope of this invention.

This application is a continuation-in-part of Serial Number 52,349, filed in the United States Patent Office on August 29, 1960, now Patent No. 3,035,968.

I claim:

1. A method for the production of a stabilized solution which comprises mixing a compound selected from the group consisting of silver oxide, zinc oxide, copper oxide, and mixtures thereof with a different compound selected from the group consisting of silver oxide, zinc oxide, copper oxide, zinc sulfate, silver sulfate, copper sulfate and mixtures thereof, reacting the resulting mixture in water with a compound selected from the group consisting of sodium persulfate, potassium persulfate and mixtures thereof, and heating the reaction mass to a temperature up to about 80° C.

2. A method for the production of a stabilized solution which comprises mixing silver oxide with a compound selected from the group consisting a zinc oxide, copper oxide, zinc sulfate, silver sulfate, copper sulfate, and mixtures thereof, reacting the resulting mixture in water with a compound selected from the group consisting of sodium persulfate, potassium persulfate, and mixtures thereof, and heating the reaction mass to a temperature up to about 80° C.

3. A method as set forth in claim 2 wherein the reaction mass is heated to a temperature of from about 60° C. to about 70° C.

4. A method for the production of a stabilized silver solution which comprises reacting in water a composition containing silver oxide with a substance selected from the group consisting of sodium persulfate, potassium persulfate, and mixtures thereof, heating the reaction mass to a temperature of from about 60° C. to about 70° C.

5. A method for the preparation of a stabilized silver solution which comprises reacting in water, at a temperature of from about 60° C. to about 70° C., from about 0.5–5.0 parts of $Ag_2O$ with from about 0.5–10.0 parts of a substance selected from the group consisting of sodium persulfate, potassium persulfate, and mixtures thereof.

6. A method as set forth in claim 4 wherein said reaction mass is maintained for at least several hours at a temperature above normal room temperature up to about 35° C.

7. A method as set forth in claim 6 wherein said reaction mass is diluted with water after reaction but while still above normal room temperature up to about 35° C.

8. A method as set forth in claim 5 wherein the reaction mass is diluted with water after reaction but while still above normal room temperature up to about 40° C.

References Cited by the Examiner

Higson: Chemical Abstract, vol. 16, 1922, page 1054[2].

LEWIS GOTTS, *Primary Examiner.*

FRANK CACCIAPAGLIA, JR., *Examiner.*